United States Patent [19]

Nakata

[11] Patent Number: 5,431,592
[45] Date of Patent: Jul. 11, 1995

[54] METHOD AND APPARATUS FOR BURNISHING MAGNETIC DISKS

[75] Inventor: Tomohiro Nakata, Kanagawa, Japan

[73] Assignee: Fuji Photo Film Co., Ltd., Kanagawa, Japan

[21] Appl. No.: 132,857

[22] Filed: Oct. 7, 1993

[30] Foreign Application Priority Data

Nov. 16, 1992 [JP] Japan ................. 4-305167

[51] Int. Cl.$^6$ ............................................. B24B 21/12
[52] U.S. Cl. ........................................ 451/63; 451/59; 451/296; 451/303; 451/307
[58] Field of Search .............. 451/296, 302, 303, 307, 451/311, 56, 57, 59, 63

[56] References Cited

U.S. PATENT DOCUMENTS

| 4,656,790 | 4/1987 | Mukai et al. ............... 51/141 |
| 5,018,311 | 5/1991 | Malagrino et al. ............... 51/140 |

FOREIGN PATENT DOCUMENTS

| 59-110546 | 6/1984 | Japan . |
| 63-318255 | 12/1988 | Japan . |
| 6462817 | 3/1989 | Japan . |
| 3276421 | 12/1991 | Japan . |

OTHER PUBLICATIONS

English language abstract for JPA 3-276421 and JPA 59-110546.

Primary Examiner—Maurina T. Rachuba
Attorney, Agent, or Firm—Sughrue, Mion, Zinn, Macpeak & Seas

[57] ABSTRACT

While a magnetic disk is being rotated, compressed air is jetted to corresponding positions on the two surfaces of the magnetic disk. An abrasive tape, which has tension in its longitudinal direction, is interposed between at least either one of the two surfaces of the magnetic disk and the compressed air jetted thereto such that the compressed air may now be jetted to the abrasive tape. The air pressure of the compressed air, which is jetted to the abrasive tape, and the tension on the abrasive tape are adjusted such that the abrasive tape may be formed into a bent shape having a level of rigidity appropriate for pushing the magnetic disk. The bent shape portion of the abrasive tape is brought into sliding contact with the magnetic surface of the magnetic disk, and the region of the sliding contact of the magnetic surface of the magnetic disk with the abrasive tape is thereby uniformly burnished.

12 Claims, 5 Drawing Sheets

METHOD AND APPARATUS FOR BURNISHING MAGNETIC DISKS

BACKGROUND OF THE INVENTION

1. Field of the Invention

This invention relates to a method for burnishing a magnetic surface of a magnetic disk (i.e. the so-called "flexible disk") with an abrasive tape, and an apparatus for carrying out the method.

2. Description of the Prior Art

In general, in a conventional method for burnishing the surface of a magnetic disk with an abrasive tape, a magnetic disk is supported on a support plate, which can be rotated, and an abrasive surface of an abrasive tape is pushed against a magnetic surface of the magnetic disk in order to burnish it. Surplus protrusions of a magnetic material on the magnetic surface are thereby removed, and the magnetic surface is smoothed.

In the conventional method, the entire area of the magnetic disk is supported by the rotatable support plate. Also, the abrasive tape is backed by a backing roll, which is constituted of a metal, rubber, or the like, or by a pushing rod constituted of felt, or the like. The abrasive tape is thus pushed against the surface of the magnetic disk.

However, the conventional method described above has the drawbacks in that abrasion debris scraped out during the burnishing with the abrasive tape, dust contained in the ambient air, foreign matter, which clings to the rear surface of the abrasive tape during the production of the abrasive tape, or the like, enters between the abrasive tape and the backing roll or the pushing rod and causes abrasion streaks to occur on the burnished surface of the magnetic disk. Also, there is the risk that nonuniform portions, such as abrasion streaks, occur on the burnished surface of the magnetic disk due to adverse effects from foreign matter or protrusions and recesses intervening between the rotatable support plate and the surface of the magnetic disk opposite to its burnished surface.

Accordingly, in U.S. Pat. No. 4,656,790, the applicant proposed a method for burnishing a magnetic disk comprising the steps of: (a) rotating a magnetic disk, (b) jetting compressed air, which has a pressure adjusted for flying an abrasive tape, from a first air nozzle to the abrasive tape, the abrasive tape being thereby caused to fly and brought into sliding contact with one surface of the magnetic disk, (c) jetting compressed air, which has a pressure adjusted for pushing the magnetic disk and independently of the pressure of the compressed air jetted from the first air nozzle, from a second air nozzle to a position on the other surface of the magnetic disk, which position is opposite to the region of the sliding contact of the magnetic disk with the abrasive tape, the other surface of the magnetic disk being thereby directly pushed, and (d) thereby uniformly burnishing the region of the sliding contact of the magnetic disk with the abrasive tape. With the proposed method for burnishing a magnetic disk, foreign matter, or the like, is blown off by the compressed air, and abrasion streaks are prevented from occurring on the burnished surface of the magnetic disk.

Also, as disclosed in, for example, Japanese Unexamined Patent Publication Nos. 59(1984)-110546 and 3(1991)-276421, it has been proposed to burnish and remove protrusions from a magnetic disk by utilizing a flexural rigidity of an abrasive tape. With the proposed methods, a slack is imparted to the abrasive tape, a bent portion is formed by the slack, the bent portion having a flexural rigidity is pushed against a magnetic surface of the magnetic disk, which is being rotated, and the magnetic disk is thereby burnished. The pushing force of the abrasive tape against the magnetic disk is determined by the bending radius of the abrasive tape, the level of rigidity of the abrasive tape, or the like.

However, with the aforesaid method for burnishing a magnetic disk by utilizing compressed air, the abrasive tape is pushed against the magnetic disk by the jetted air pressure. Therefore, the rigidity of the abrasive tape is low, and a sufficient contact pressure cannot be given to the magnetic disk. Accordingly, in order for a sufficient burnishing depth to be obtained, the burnishing operation must be carried out for a long time, and therefore the efficiency, with which the burnishing operation is carried out, cannot be kept high. Also, if compressed air having a higher pressure is jetted to the abrasive tape such that a higher contact pressure may be obtained, the abrasive tape will flutter, and a stable contact pressure cannot be obtained.

The aforesaid methods for burnishing a magnetic disk by utilizing a flexural rigidity of an abrasive tape has the drawbacks in that the bent portion of the abrasive tape, which is brought into sliding contact with the magnetic disk, receives a reaction load from the magnetic disk, and the bending radius of the bent portion fluctuates. Therefore, a stable contact pressure cannot be obtained, and the magnetic disk cannot be burnished uniformly.

As described above, the conventional burnishing methods described above have the drawbacks in that efficient and uniform burnishing operations cannot be carried out.

SUMMARY OF THE INVENTION

The primary object of the present invention is to provide a method for burnishing a magnetic disk, wherein a magnetic disk is burnished efficiently and uniformly.

Another object of the present invention is to provide a method for burnishing a magnetic disk, wherein the contact pressure of an abrasive tape and the burnishing depth are adjusted easily.

The specific object of the present invention is to provide an apparatus for carrying out the method for burnishing a magnetic disk.

The present invention provides a method for burnishing a magnetic disk, wherein at least either one of the two surfaces of a magnetic disk is burnished with an abrasive tape, the method for burnishing a magnetic disk comprising the steps of:
i) rotating the magnetic disk,
ii) jetting compressed air to corresponding positions on the two surfaces of the magnetic disk,
iii) interposing the abrasive tape, which has tension in its longitudinal direction, between at least either one of the two surfaces of the magnetic disk and the compressed air jetted thereto such that said compressed air may now be jetted to the abrasive tape,
iv) adjusting the air pressure of said compressed air, which is jetted to the abrasive tape, and the tension on the abrasive tape such that the abrasive tape may be formed into a bent shape having a level of rigidity appropriate for pushing the magnetic disk, v) bringing the bent shape portion of the abrasive tape into sliding contact with the magnetic surface of the magnetic disk, and vi) thereby uniformly burnishing the region of the sliding contact of the magnetic surface of the magnetic disk with the abrasive tape.

The present invention also provides an apparatus for carrying out the method for burnishing a magnetic disk in accordance with the present invention. Specifically, the present invention also provides an apparatus for burnishing a magnetic disk, wherein at least either one of the two surfaces of a magnetic disk is burnished with an abrasive tape, the apparatus for burnishing a magnetic disk comprising:

i) a drive mechanism for supporting and rotating the magnetic disk, ii) two air nozzles located on opposite surface sides of the magnetic disk such that the two air nozzles may stand facing corresponding positions on the two surfaces of the magnetic disk, each of the two air nozzles having an air jetting port at a leading end, from which compressed air is jetted to the magnetic disk, iii) the abrasive tape interposed between at least either one of the two air nozzles and the magnetic disk such that the abrasive tape may extend along the leading end of the air nozzle, iv) a tape support means, which imparts a predetermined level of tension in the longitudinal direction of the abrasive tape to the abrasive tape, and v) an adjustment means for adjusting the tension on the abrasive tape and the air pressure of the compressed air, which is jetted to the abrasive tape, such that the abrasive tape may be formed into a bent shape having a level of rigidity appropriate for standing in sliding contact with the magnetic disk, the leading end of the air nozzle located on the side, on which the abrasive tape is interposed, being constituted of two tapered oblique surfaces and a plane, which is adjacent to the two oblique surfaces, which is approximately parallel to the magnetic surface of the magnetic disk, and which is provided with the air jetting port.

With the method for burnishing a magnetic disk in accordance with the present invention, the longitudinal tension of the abrasive tape extending along the tapered oblique surfaces of the air nozzle is adjusted, and the portion of the abrasive tape is thereby formed into the bent shape, which has the flexural rigidity and which is convex towards the magnetic disk. Compressed air is jetted from the air nozzle to the rear surface of the bent portion of the abrasive tape. The bent portion of the abrasive tape is thus kept in a predetermined shape and pushed against the magnetic surface of the magnetic disk. In this manner, the contact pressure between the magnetic disk and the abrasive tape can be kept stable. Therefore, the magnetic disk can be burnished uniformly.

Also, the air pressure of the compressed air jetted to the abrasive tape and the tension on the abrasive tape are adjusted independently. Therefore, the flexural rigidity of the bent portion of the abrasive tape can be adjusted easily, and an efficient burnishing operation can be carried out by adjusting the contact pressure between the magnetic disk and the abrasive tape. Also, in cases where a different kind of a magnetic disk is to be burnished, the adjustment of the air pressure of the compressed air jetted to the abrasive tape and the adjustment of the tension on the abrasive tape can be carried out independently and appropriately for the magnetic disk to be burnished. Accordingly, various kinds of magnetic disks can be burnished accurately under appropriate contact pressures.

With the apparatus for burnishing a magnetic disk in accordance with the present invention, the method for burnishing a magnetic disk in accordance with the present invention can be carried out easily. Also, uniform burnishing operations can be carried out efficiently and reliably.

DESCRIPTION OF THE PREFERRED EMBODIMENTS

The present invention will hereinbelow be described in further detail with reference to the accompanying drawings.

Figure 1:
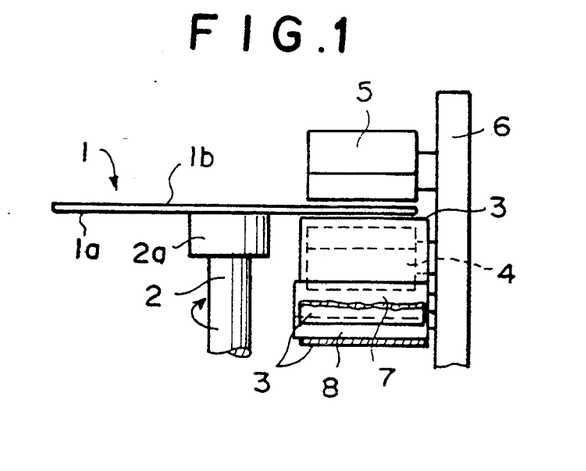
FIG. 1 is a front view showing an embodiment of the apparatus for burnishing a magnetic disk in accordance with the present invention.
Figure 2:
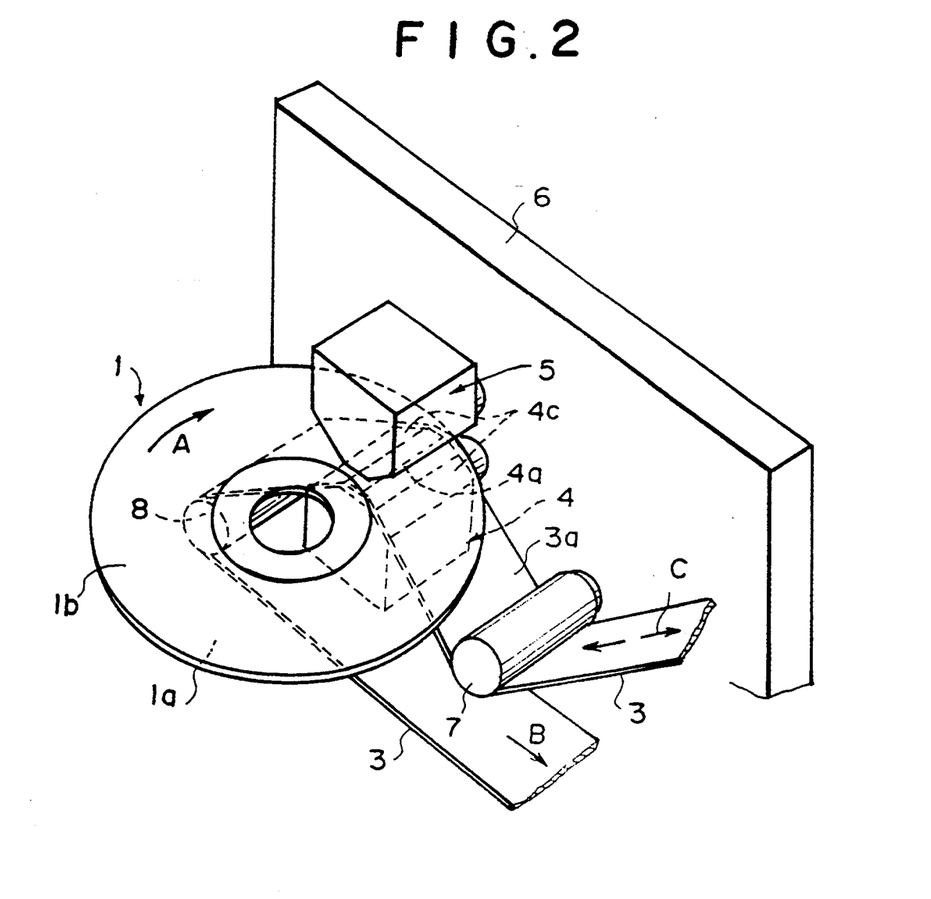
FIG. 2 is a perspective view showing the embodiment of FIG. 1 with a drive mechanism omitted.
Figure 3:
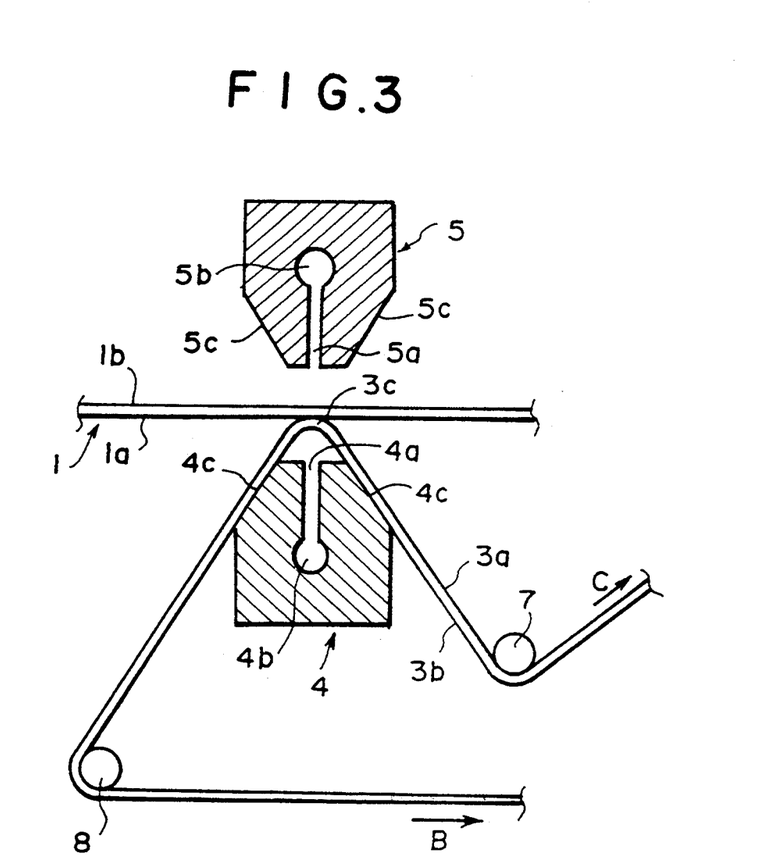
FIG. 3 is a sectional view showing the region in the vicinity of air nozzles in the embodiment of FIG. 1.

FIG. 1 is a front view showing an embodiment of the apparatus for burnishing a magnetic disk in accordance with the present invention. FIG. 2 is a perspective view showing the embodiment of FIG. 1 with a drive mechanism omitted. FIG. 3 is a sectional view showing the region in the vicinity of air nozzles in the embodiment of FIG. 1.

A magnetic disk (a flexible disk) 1 comprises a recording and reproducing region 1a, i.e. a magnetic surface to be burnished, and an inner circumferential region 1b, which is positioned more inward than the magnetic surface 1a. The inner circumferential region 1b is held by a vacuum chuck 2a, which is secured to a leading end of a rotation shaft 2. The rotation shaft 2 is rotated by a drive mechanism (not shown), and the magnetic disk 1 is thereby rotated at a speed falling within the range of, for example, 1,000 rpm to 2,000 rpm. As the means for holding the magnetic disk 1, a mechanical chuck may be employed in lieu of the vacuum chuck.

An abrasive surface 3a of an abrasive tape 3 is brought into close contact with the magnetic surface 1a of the magnetic disk 1, and the magnetic surface 1a is thereby burnished.

Close contact of the abrasive tape 3 with the magnetic disk 1 is achieved by the formation of a bent portion 3c of the abrasive tape 3, which bent portion has the flexural rigidity, and compressed air, which is jetted from a second air nozzle 5 to the magnetic disk 1. The second air nozzle 5 is located facing a first air nozzle 4 with the magnetic disk 1 intervening therebetween. The bent portion 3c having the flexural rigidity is formed by the tension imparted to the abrasive tape 3 in the direction indicated by the arrow C, the compressed air jetted from the first air nozzle 4 to the abrasive tape 3, and the shape of the leading end of the first air nozzle 4.

Specifically, the first air nozzle 4 for backing the abrasive tape 3 is located on the lower surface side of the magnetic disk 1. An air jetting port 4a of the first air nozzle 4 is located close to the magnetic surface 1a of the magnetic disk 1, which is to be burnished. The abrasive tape 3 is interposed between the air jetting port 4a and the magnetic disk 1. More specifically, the first air nozzle 4 has a plane, which is provided with the air jetting port 4a and which is finished approximately flat so as to stand facing the magnetic surface 1a. The first air nozzle 4 also has two oblique surfaces 4c, which are adjacent to the plane provided with the air jetting port 4a. The abrasive tape 3 is threaded over the two oblique surfaces 4c, 4c. A tape feed means (not shown) imparts the tension in the direction indicated by the arrow C to the abrasive tape 3. By the tape feed means, the bent portion 3c having the flexural rigidity is formed above the plane provided with the air jetting port 4a. The bent portion 3c of the abrasive tape 3 is brought into close contact with the magnetic surface 1a of the magnetic disk 1.

Also, the second air nozzle 5 is located at the position facing the first air nozzle 4 with the magnetic disk 1 intervening therebetween. The second air nozzle 5 jets compressed air for bearing the burnishing pressure exerted from the abrasive tape 3 to the magnetic disk 1. The second air nozzle 5 has an air jetting port 5a, which is located close to the magnetic disk 1.

The first air nozzle 4 and the second air nozzle 5 are spaced a predetermined distance from each other and secured to a support plate 6. Compressed air of a predetermined pressure is introduced into an air passage 4b, which is located at a middle portion of the first air nozzle 4, via the support plate 6. The compressed air having been introduced into the air passage 4b is communicated from the air passage 4b to the narrow slit-like air jetting port 4a and is thereby pressurized and jetted. Also, compressed air of a predetermined pressure is introduced into an air passage 5b, which is located at a middle portion of the second air nozzle 5, via the support plate 6. The compressed air having been introduced into the air passage 5b is communicated from the air passage 5b to the narrow slit-like air jetting port 5a and is thereby pressurized and jetted.

The air pressure of the compressed air, which is jetted from the first air nozzle 4, and the air pressure of the compressed air, which is jetted from the second air nozzle 5, can be adjusted independently at arbitrary pressure values by pressure varying means (not shown). By way of example, the air pressure of the compressed air, which is jetted from the first air nozzle 4, should preferably be adjusted so as to fall within the range of approximately 0.5 to 3.0 kgf/cm$^2$. Also, the air pressure of the compressed air, which is jetted from the second air nozzle 5, should preferably be adjusted so as to fall within the range of approximately 1.5 to 5.0 kgf/cm$^2$.

The abrasive tape 3 is threaded over guide rollers 7 and 8, which are located on opposite sides of the first air nozzle 4. The abrasive tape 3 passes from the guide roller 7 to the oblique surface 4c which is formed at the leading end of the first air nozzle 4. The abrasive tape 3 is then bent by the guide roller 8 and travels in the direction indicated by the arrow B. Also, as described above, the bent portion 3c, which is convex towards the magnetic disk 1, is formed in the abrasive tape 3 by the tension, which is imparted in the direction indicated by the arrow C to the abrasive tape 3 by the tape feed means (not shown). The tension On the abrasive tape 3 can be set at an arbitrary value by a tension adjusting means (not shown). By way of example, the tension on the abrasive tape 3 should preferably fall within the range of approximately 500 gf to 1,500 gf. The abrasive tape 3 is intermittently fed by the tape feed means (not shown) such that it may travel reversely to the direction of rotation of the magnetic disk 1.

While the magnetic disk 1 is being rotated quickly by the drive mechanism, the compressed air of a predetermined pressure is jetted from the first air nozzle 4 to the abrasive tape 3. Also, the compressed air of a predetermined pressure is jetted from the second air nozzle 5 to the magnetic disk 1. In this manner, the rear surface 3b (i.e. the surface opposite to the abrasive surface 3a) of the bent portion 3c of the abrasive tape 3, which stands in close contact with the magnetic surface 1a of the magnetic disk 1, is pushed such that the bent portion 3c may be kept in a predetermined bent shape and such that the flexural rigidity of the bent portion 3c may be kept at a predetermined level. The bent portion 3c of the abrasive tape 3 having the flexural rigidity kept at the predetermined level is brought into sliding contact with the magnetic surface 1a of the magnetic disk 1, and the magnetic surface 1a is burnished quickly and uniformly.

The flexural rigidity of the bent portion 3c of the abrasive tape 3 can be increased or decreased by adjusting the tension, which is imparted to the abrasive tape 3 by the tape feed means, and the air pressure of the compressed air jetted to the abrasive tape 3. In this manner, appropriate burnishing conditions can be set easily.

In this embodiment, the burnishing operation is carried out while the abrasive tape 3 is traveling reversely to the direction of rotation of the magnetic disk 1. Alternatively, the abrasive tape 3 may travel in the same direction as the direction of rotation of the magnetic disk 1. As another alternative, the abrasive tape 3 may be kept stationary for the burnishing operation and moved after completion of each burnishing operation.

Also, in this embodiment, the operation for burnishing the magnetic disk 1 is carried out from below the magnetic disk 1. Alternatively, the operation for burnishing the magnetic disk 1 is carried out from above the magnetic disk 1. As another alternative, the upper and lower surfaces of the magnetic disk 1 may be burnished simultaneously during a single process. As a further alternative, the upper and lower surfaces of the magnetic disk 1 may be burnished one after the other with independent processes. In such cases, the second air nozzle 5 will be formed into the same shape as the first air nozzle 4, and an additional set of the mechanism for feeding the abrasive tape 3 will be added.

Results of experiments carried out on the aforesaid embodiment will be described hereinbelow.

Figure 4:
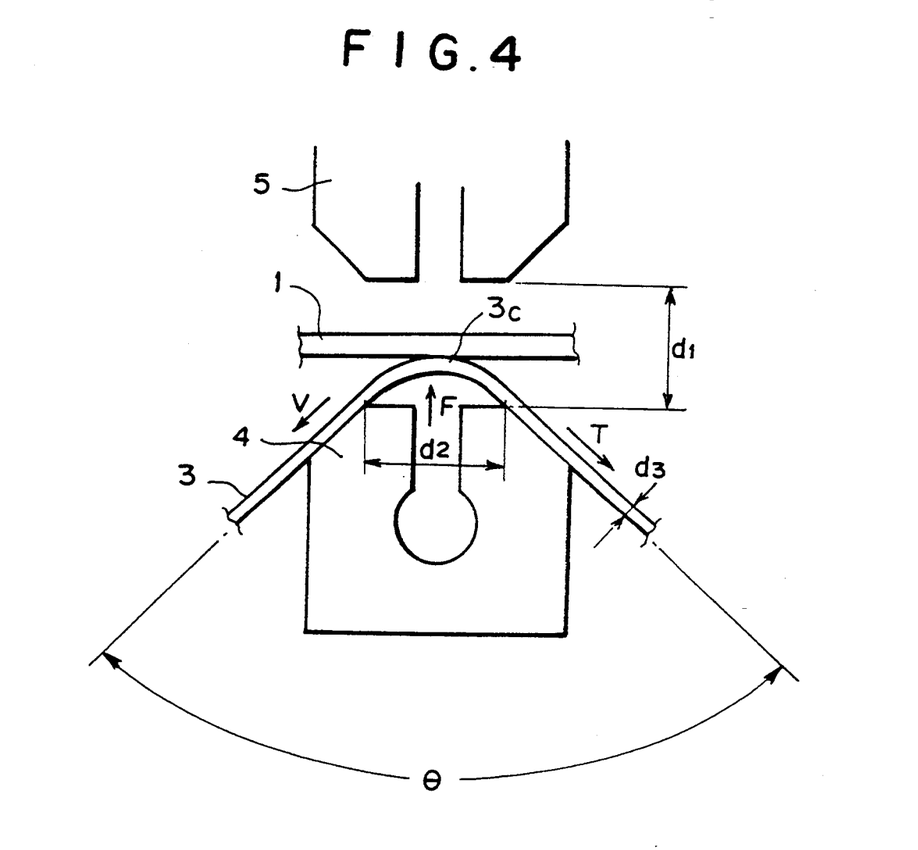
FIG. 4 is a detail view showing the region in the vicinity of air nozzles in the embodiment of FIG. 1.

FIG. 4 is a detail view showing the region in the vicinity of the air nozzles 4 and 5 in the aforesaid embodiment. In the embodiment described above, the base thickness d3 of the abrasive tape 3 is an important factor in setting the flexural rigidity of the bent portion 3c.

Figure 5:
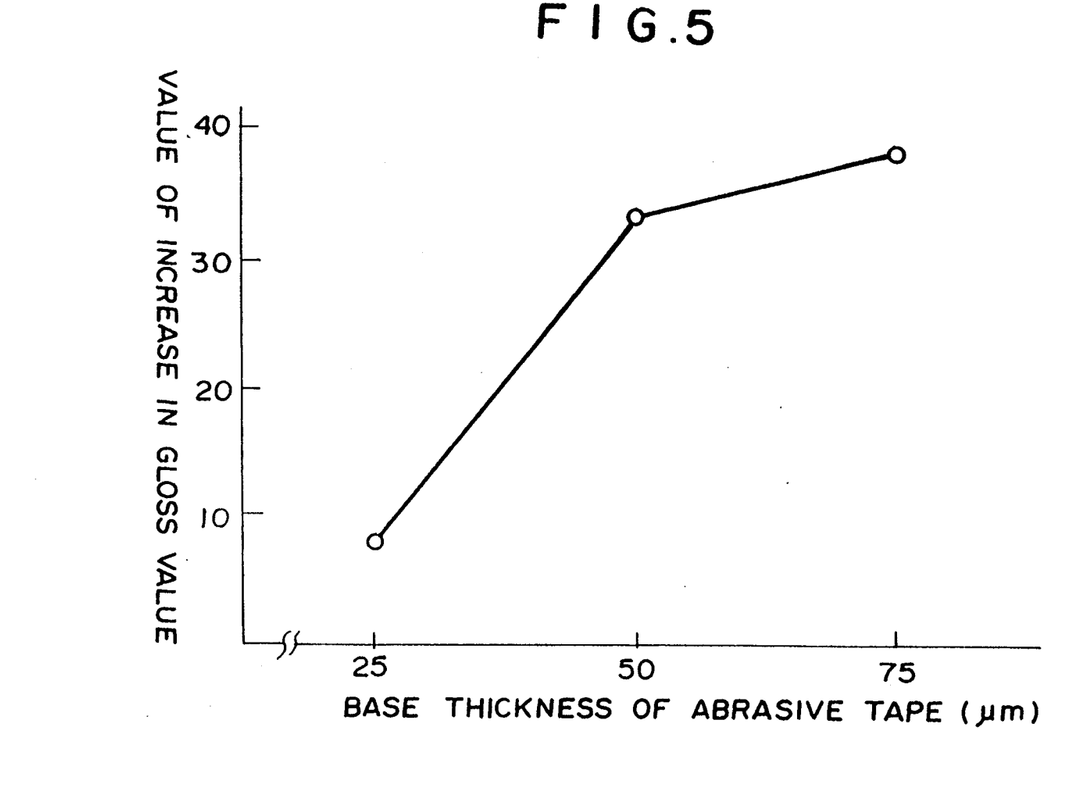
FIG. 5 is a graph showing the results of experiments on the relationship between a base thickness of an abrasive tape and an increase in the gloss value of a magnetic disk.

FIG. 5 is a graph showing the gloss values of the magnetic disk 1 after being burnished, which gloss values were obtained when the burnishing conditions described below were kept constant and the base thickness d3 of the abrasive tape 3 was set at 25, 50, and 75 [μm].

Burnishing Conditions

Air pressure F of compressed air jetted from the air nozzle located on the side of the abrasive tape: 1.5 [kgf/cm²]

Tension T on the abrasive tape: 500 [gf]

Burnishing time t: 0.8 [second]

Abrasive tape feed speed v: 5 [mm/second]

Clearance d1 between upper and lower air nozzles: 0.5 [mm]

Taper angle θ of the leading end of the air nozzle located on the side of the abrasive tape: 30 [degrees]

Flat portion length d2 of the leading end of the air nozzle located on the side of the abrasive tape: 4 [mm]

Rotation speed of the magnetic disk: 1,500 [rpm]

As is clear from the graph of FIG. 5, the gloss value of the magnetic disk becomes higher, i.e. the burnishing finish state of the magnetic disk becomes better, as the base thickness d3 of the abrasive tape is larger.

Figure 6:
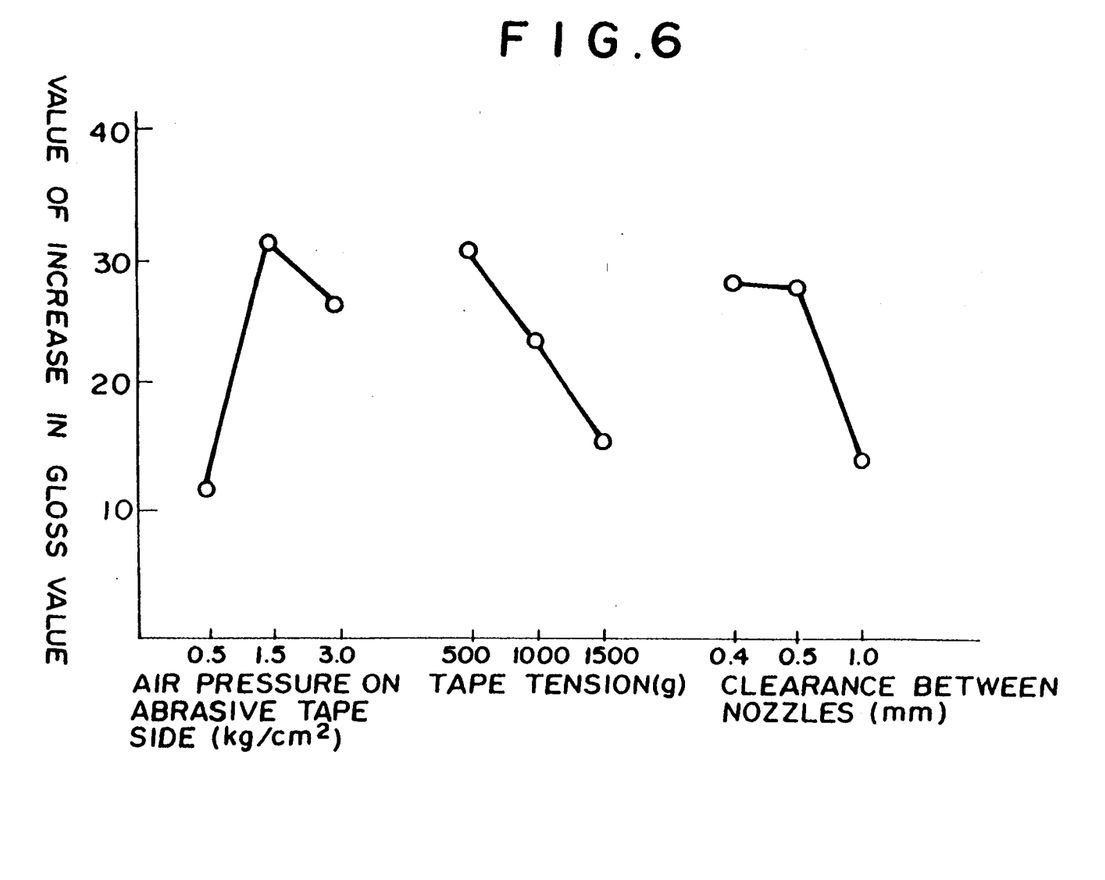
FIG. 6 is a graph showing the results of experiments on the relationships between an air pressure of compressed air jetted from an air nozzle to an abrasive tape, the tension on the abrasive tape, a clearance between upper and lower air nozzles and an increase in the gloss value of a magnetic disk.

FIG. 6 is a graph showing the results of factorial experiments using the experimental design method on a change of an increase in the gloss value of the magnetic disk encountered when the air pressure of compressed air jetted from the air nozzle located on the side of the abrasive tape, the tension on the abrasive tape, and the clearance between the upper and lower air nozzles are changed. As is clear from the graph of FIG. 6, the increase in the gloss value becomes largest when the air pressure of compressed air jetted from the air nozzle located on the side of the abrasive tape is 1.5 [kgf/cm²], the tension on the abrasive tape is 500 [gf], and the clearance between the upper and lower air nozzles is not larger than 0.5 [mm]. The value of the increase in the gloss value thus obtained was 52.6.

As described above, with the method for burnishing a magnetic disk in accordance with the present invention, the contact pressure between the magnetic disk and the abrasive tape can be kept uniform, and therefore the magnetic disk can be burnished uniformly.

Also, with the method for burnishing a magnetic disk in accordance with the present invention, wherein the air pressure of the compressed air, which is jetted to the abrasive, and the tension on the abrasive tape are adjusted independently, the flexural rigidity of the bent portion of the abrasive tape can be adjusted easily. Also, an efficient burnishing operation can be carried out by adjusting the contact pressure between the magnetic disk and the abrasive tape. Further, in cases where a different kind of a magnetic disk is to be burnished, the adjustment of the air pressure of the compressed air jetted to the abrasive tape and the adjustment of the tension on the abrasive tape can be carried out independently and appropriately for the magnetic disk to be burnished. Accordingly, various kinds of magnetic disks can be burnished accurately under appropriate contact pressures.

What is claimed is:

1. A method for burnishing a magnetic disk, wherein at least one of two surfaces of said magnetic disk is burnished with an abrasive tape, the method for burnishing said magnetic disk comprising the steps of:
  i) rotating said magnetic disk,
  ii) jetting compressed air from an air jetting port of each of two air nozzles to corresponding positions on said two surfaces of said magnetic disk, wherein at least one of said two air nozzles comprises two oblique surfaces and a planar surface therebetween and wherein said planar surface is approximately parallel to said magnetic surface of said magnetic disk,
  iii) interposing said abrasive tape, which has tension in its longitudinal direction, between said magnetic disk and said at least one of said two air nozzles such that said compressed air may now be jetted to said abrasive tape,
  iv) adjusting air pressure of said compressed air, which is jetted to said abrasive tape, and said tension on said abrasive tape such that said abrasive tape may be formed into a bent shape portion having a level of rigidity appropriate for standing in sliding contact with said magnetic disk,
  v) bringing said bent shape portion of said abrasive tape into sliding contact with said magnetic surface of said magnetic disk, and
  vi) thereby uniformly burnishing a region of said sliding contact of said magnetic surface of said magnetic disk with said abrasive tape.

2. A method as defined in claim 1 wherein said air pressure of said compressed air, which is jetted to said abrasive tape, falls within a range of approximately 0.5 to 3.0 kgf/cm².

3. A method as defined in claim 1 wherein said air pressure of said compressed air, which is jetted to at least one of said two surfaces of said magnetic disk opposite to said abrasive tape, falls within a range of approximately 1.5 to 5.0 kgf/cm².

4. A method as defined in claim 1 wherein said tension on said abrasive tape falls within a range of approximately 500 gf to 1,500 gf.

5. An apparatus for burnishing a magnetic disk, wherein at least one of two surfaces of said magnetic disk is burnished with an abrasive tape, the apparatus for burnishing said magnetic disk comprising:
  i) a drive mechanism for supporting and rotating said magnetic disk,
  ii) two air nozzles located on each side of said magnetic disk such that said two air nozzles may stand facing corresponding positions on each of said two surfaces of said magnetic disk, each of said two air nozzles having an air jetting port from which compressed air is jetted to said magnetic disk,
  iii) said abrasive tape interposed between at least one of said two air nozzles and said magnetic disk,
  iv) a tape support means, which imparts a predetermined level of tension in longitudinal direction of said abrasive tape to said abrasive tape, and
  v) an adjustment means for adjusting said tension on said abrasive tape and said air pressure of said compressed air, which is jetted to said abrasive tape, such that said abrasive tape may be formed into a bent shape portion having a level of rigidity appropriate for standing in sliding contact with said magnetic disk, wherein said at least one of said two air nozzles comprises two oblique surfaces and a planar surface therebetween, wherein said planar surface is approximately parallel to said magnetic surface of said magnetic disk.

6. An apparatus as defined in claim 5 wherein said air pressure of said compressed air, which is jetted to said abrasive tape, falls within a range of approximately 0.5 to 3.0 kgf/cm$^2$.

7. An apparatus as defined in claim 5 wherein said air pressure of said compressed air, which is jetted to at least one of said two surfaces of said magnetic disk opposite to said abrasive tape, falls within a range of approximately 1.5 to 5.0 kgf/cm$^2$.

8. An apparatus as defined in claim 5 wherein said tension on said abrasive tape falls within a range of approximately 500 gf to 1,500 gf.

9. A method as defined in claim 1 wherein said planar surface is located between said two oblique surfaces and meets said two oblique surfaces at lines of intersection which are at a point of each of said two oblique surfaces which is closest to said magnetic disk.

10. An apparatus as defined in claim 5 wherein said planar surface is located between said two oblique surfaces and meets said two oblique surfaces at lines of intersection which are at a point of each of said two oblique surfaces which is closest to said magnetic disk.

11. A method as defined in claim 1 wherein said planar surface is provided with said air jetting port.

12. An apparatus as defined in claim 5 wherein said planar surface is provided with said air jetting port.

* * * * *